July 8, 1941.  H. L. PITMAN  2,248,190
COMBINED TYPEWRITER AND COMPUTING MACHINE
Filed June 29, 1939  2 Sheets-Sheet 2

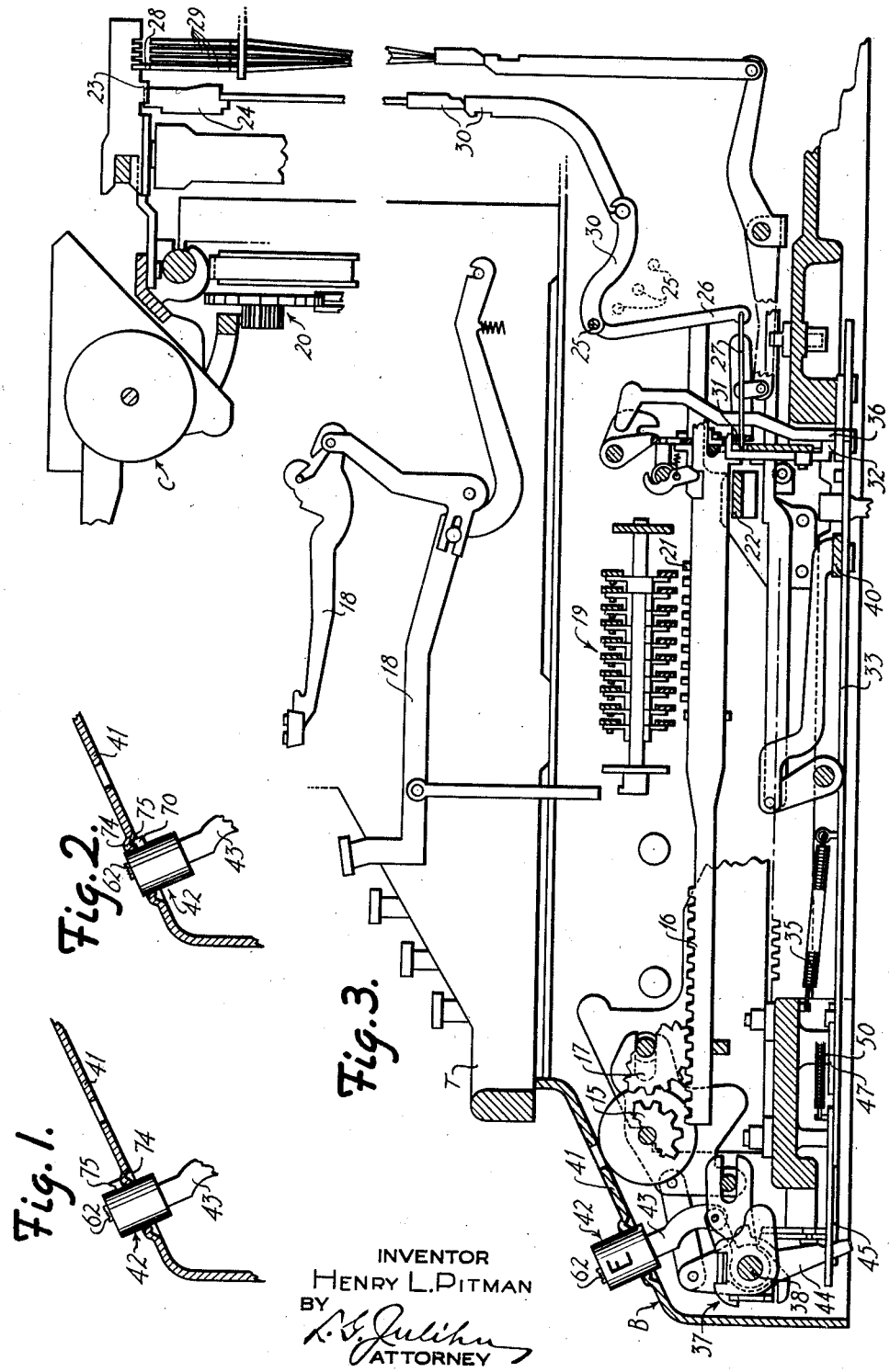

INVENTOR
HENRY L. PITMAN
BY
*L. G. Julihn*
ATTORNEY

Patented July 8, 1941

2,248,190

UNITED STATES PATENT OFFICE 2,248,190

COMBINED TYPEWRITER AND COMPUTING MACHINE

Henry L. Pitman, Hartford, Conn., assignor to Underwood Elliott Fisher Company, New York, N. Y., a corporation of Delaware Application June 29, 1939, Serial No. 281,849

1 Claim. (Cl. 235—145)

This invention relates to manipulative controls in a computing machine or the like and deals particularly with manipulatively controlling computing-state controllers employed as shown in my U. S. Patent No. 2,118,860, relating to a combined typewriting and computing machine having a plurality of registers.

In such machine there is a plurality of state controllers, one for each of the several registers. The state controllers are normally latched in neutral position and are selectively releasable, according to a program automatically controlled by the typing carriage, for resultant spring-urged movement to computing-determining positions. The machine has a general operator which may be cycled to actuate sets of computing wheel drivers after these have been indexed through operation of numeral-type keys and denomination-selecting cooperation of said carriage. The machine also has throw-off keys, one for each register, selectively operable to suppress the carriage-controlled state controllers by restoring, or preventing the movement of, those state controllers that correspond to the operated throw-off keys.

The throw-off or suppression of the state controllers is maintained until the general operator is cycled, in that, normally, the cycled general operator automatically negatives any operated throw-off key and thereby renders the corresponding state controller controllable by the carriage again.

An object of the invention is to provide means readily settable at will to maintain the suppression of state controllers, as effected by the throw-off keys, irrespective of the cycling of the general operator.

Another object is to apply such settable means to the throw-off keys for locking the latter in operated position, thereby, to maintain the suppression of the state controllers.

Another object is to provide such settable means in a form readily applicable to existing machines such as exemplified in my aforesaid patent.

Another object is to arrange such settable means so that the same will also serve to lock a throw-off key against operation. This feature is useful in machines having many registers and correspondingly many throw-off keys. The accounting work may often be of such order as to require occasional use of, say, only one or two of the many throw-off keys. Hence it is advantageous to provide for locking the other throw-off keys to guard against operating them inadvertently.

The foregoing and other objects, features, and advantages will be apparent from the following description of a preferred embodiment of the invention.

In the accompanying drawings:

Figure 1 is a side view partly sectioned showing a key locked against depression.

Figure 2 is a view similar to Figure 1 showing the key depressed and locked against restoration.

Figure 3 is a sectional side elevation of a combined typewriting and computing machine relating to the invention.

Figure 4:
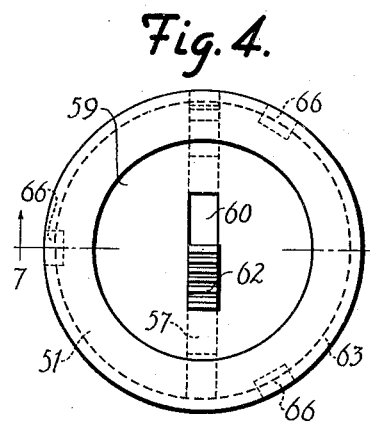
Figure 4 is an enlarged scale top plan view of the throw-off key showing the locking device set in ineffective position.

Referring now more particularly to the drawings, a typewriter T, Figure 3, surmounts a computing base B which may have a plurality of registers each comprising a set of computing wheels 15 and a corresponding set of drivers 16 and idler pinions 17. Numeral type actions 18 and pin-setting linkages 19 are cooperable to set index pins 21 in the drivers or register bars 16 preparatory to actuating the latter by means of a reciprocatable cross car 22 that forms part of a general operator mechanism which may be cycled.

As a carriage C of the typewriter traverses, under control of letter feed mechanism 20, a computing zone, a tappet 23 on said carriage traverses a set of denominational jacks 24 operatively connected as shown, Figure 3, to corresponding cross shafts 25 which present sets of depending arms 26 connectible by sets of couplers 27 to corresponding sets of register bars 16.

While the carriage C traverses a computing zone, a tappet 28 thereon keeps depressed a cam plate 29 which through connections generally indicated at 30 lifts a coupler-guiding bail 31 to place a corresponding set of couplers 27 into operative connection with the rear end of a corresponding set of register bars 16. Any set of register bars is thus operatively connectible to the set of denominational jacks 24 so that as the latter are depressed seriatim by the carriage tappet 23, said register bars are advanced in denominational order to bring their index pins 21 under the pin-setting linkages 19.

The lift of a coupler bail 31 raises a latch bolt 32 to withdraw the latter from and release a slidably supported state controller bar 33 for consequent forward shift (leftward of Figure 3) of said bar 33 by a spring 35. Said shift is limited by a secondary bolt 36 which is retractible under control of the carriage for a consequent further forward and suitably limited shift of said state controller bar 33. Coupling mechanism 37 is differentially conditionable by the described different shifts of the state controller bar 33 to enable a universal rock shaft 38 of the general operator mechanism to throw the computing wheels 15 into and out of mesh either with racks on the register bars 16 or with their idlers 17 during a general operator cycle. There is for each register, individually, a cam plate 29, state controller bar 33 and coupling mechanism 37 so that operation of the several registers may be selectively determined by the carriage according to a program predetermined by providing one or more of the tappets 28 for any computing zone of the carriage.

A transverse restorer bar 40 is moved rightwardly, Figure 3, by the general operator mechanism during a final portion of a general operator cycle. Said bar 40 may thus restore the state controller bars 33 to the control of their latch bolts 32, 36 inasmuch as the general operator is cycled only when the carriage has left a computing zone and hence has left no cam plate 29 depressed.

Projecting through a keyhole in the sheet metal top 41 of the computing base casing is a cylindrical throw-off key 42 having a stem 43 connected to a bell crank 44 turnable about the rock shaft 38. Said bell crank 44 is articulated to a slidably supported bar 45, Figures 3, 6 and 9, having a cam edge 46. Each state controller bar 33 has individually its own throw-off key 42 and bar 45. As a state controller bar 33 is shifted forwardly, it turns a stationarily pivoted bell-crank lever 47 clockwise, Figures 6 and 9, to bring a half-round cam-and-latch stud 48 thereon into the path of said cam edge 46. By depressing the throw-off key 42, the bar 44 is moved forwardly and thus its cam edge 46 turns said lever 47 counterclockwise to restore the forwardly shifted state controller bar 33. The forward movement of said bar 45 also brings a latch recess 49 thereof to the stud 48 to interlock the lever 47 and bar 45 substantially as in Figure 6. This interlock holds not only the state controller bar 33 in restored or suppressed position but also holds the bar 45 against rearward restoration by its spring 50.

Figure 6:
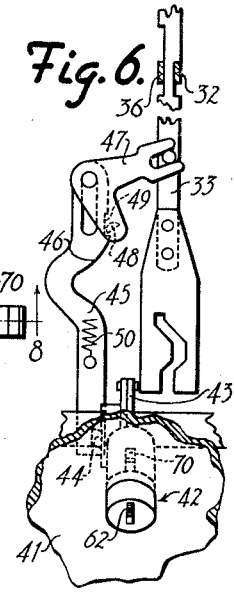
Figure 6 is a plan view showing the locking device set to maintain the throw-off key in depressed position to suppress a state controller.

When the general operator is cycled, there is rearward movement of the restorer bar 40 sufficiently in excess to move the state controller bar, as suppressed in Figure 6, slightly rearward thereby rocking the lever 47 slightly counterclockwise to withdraw its stud 48 from the bar 45 so that the latter then is restored rearwardly by its spring 50 which may be anchored to the framework.

The mechanism so far described in brief detail is substantially as shown in my aforesaid Patent No. 2,118,860 to which reference may be had, the above description being deemed sufficient for an understanding of the present invention and its utility which now will be described.

It is useful, in certain forms of accounting, to repeat or resume the throw-off-key-effected suppression of a state controller bar 33 after a general operator cycle has negatived such suppression. The suppression may be resumed, of course, by reoperation of the throw-off key 42 after the cycle. However, to avoid such repeated operation of a throw-off key, there may be provided means settable at will to keep a state controller bar 33 suppressed irrespective of a cycle of the general operator mechanism. Said means are preferably applied to the throw-off key 42, for keeping the latter depressed, as follows:

A cylindrical body 51 of the key has a bottom cross slot 52 into which the upper end of the key stem 43 is inserted. The key body 51 may have a reduced neck 53 into which a pin 54 is driven to secure the body 51 to the key stem 43. The top of the key body 51 has a diametrical slot 55 for a latch plate 57. A disk 58 of substantially the same diameter as the key body 51 overlies the latter and may be surmounted by a capping disk 59 which may have a concave top surface. Each disk 58, 59 is perforated to form an opening 60 of rectangular outline through which a tab 61 of the latch plate 57 projects upwardly. Said tab 61 may have a suitably scored top 62 to which the operator's finger may be applied for manipulating said latch plate 57.

Figure 5:
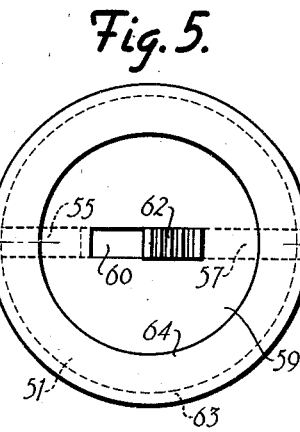
Figure 5 is a view similar to Figure 4 showing the locking device set in effective position.
Figure 7:
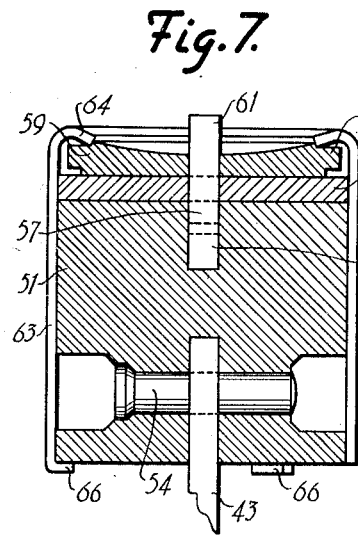
Figure 7 is a cross-sectional view of the key taken on the trace 7—7 of Figure 4.
Figure 8:
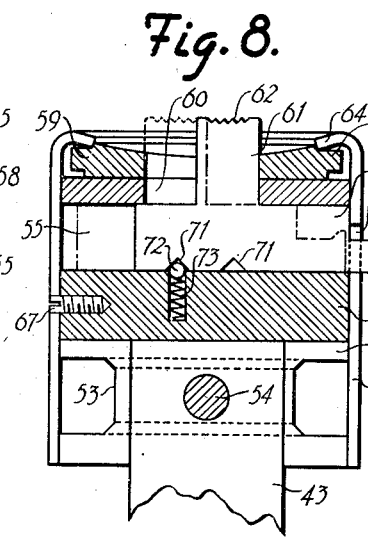
Figure 8 is a cross-section view of the key taken on the trace 8—8 of Figure 5.
Figure 9:
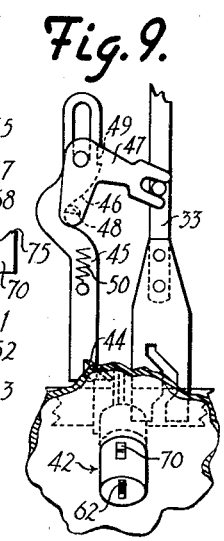
Figure 9 is a plan view showing the locking device operative to prevent depression of the throw-off key.

A sleeve 63 surrounds the key body 51 and lower disk 58 and has an inturned top flange 64 which may bear, Figure 7, upon a shouldered brim 65 of the upper disk 59 to hold the latter and the underlying disk 58 down upon and concentric with the key body 51. The sleeve 63 may be held in place by any suitable means such as short sleeve prongs 66, Figure 7, that may be bent inwardly and clinched against the bottom of the key body 51 after the parts have been assembled. An alternative sleeve fastening may be a screw-pin 67 threaded into the key body 51, Figure 8. In any case the sleeve 63 is to be kept from turning on the key body 51 so that an opening 68 in the side of the sleeve coincides with the key-body slot 55. Said latch plate 57 is thus slidably settable between a position in which a vertically reduced tongue 70 of the latch plate 57 is retracted substantially within the key, and a position in which said tongue 70 is projected, through the sleeve opening 68, beyond the side of the sleeve 63. The retracted position of the latch plate 57 is indicated in Figure 4 and by the dotted outline in Figure 8, and the projected position of the latch plate is indicated in Figures 5, 6 and 9 and by the full outline in Figure 8. The movements of the latch plate between said positions may be limited by abutment of the tab 61 with the edge of the disk opening 60.

The latch plate 57 may be held in either position through a limitedly frictional fit thereof within the key body slot 55. Alternatively, a spring pressed detent may engage detent notches 71 in the latch plate 57 and such detent may comprise a ball 72 pressed upwardly by a spring 73 recessed in a hole in the key body, Figure 8.

Ordinarily the throw-off key 42 may be depressed, for suppressing the state controller bar 33, without projecting the latch plate 57. In that case, the companion bar 45 will be interlocked with the lever 47 to maintain the state controller bar 33 in suppressed position. Such suppression lasts until a subsequent cycle of the general operator releases said bar 45 for consequent restoration by its spring 50, thereby to terminate the suppression of the state controller bar 33.

But if the suppression of the state controller bar 33 is to be continued, the latch plate 57 is projected by the operator's finger immediately after the latter has depressed the throw-off key 42 so that the tongue 70 of the latch plate 57 will be caught under the edge of the keyhole in the casing-top-plate 41. The casing at the edge of said keyhole may have a bead forming an annular recess 74 on the underside of the keyhole edge in which a hook or spur 75 on the projected latch plate tongue 70 may catch. In depressing the throw-off key 42, the operator's finger may engage the tab top 62 of the latch plate 57 for controlling the latter. As soon as the operator's finger releases the depressed throw-off key 42 after having projected the latch plate 57, the spring 50 on the bar 45, tending to restore the key 42, causes the projected spur 75 to settle in said recess 74 as at Figure 2 for keeping the latch plate 57 projected to hold the throw-off key 42 down.

With the key 42 thus held down, restoration of the bar 45 is prevented when the latch stud 48 is withdrawn momentarily from said bar 45 during a general operator cycle. With the bar 45 thus kept in operated position, the state controller bar 33 is maintained in suppressed position, Figure 6.

For terminating the hold-down of the key 42, the operator's finger may depress said key slightly below its Figure 2 position and at the same time, by means of the tab 61, move the latch plate 57 forwardly to its retracted position again preparatory to restoration of the key 42. Said key 42 may then become restored through a subsequent general operator cycle which, as explained, causes the lever 47 to be turned slightly counterclockwise of Figure 6 to release the bar 45.

With the key 42 in its normal position, the latch plate 57 may also be projected at will so that its tongue 70 overlies the casing at the edge of the keyhole. This locks the key 42 against depression as will be evident from Figure 1; and to render the key depressible again the operator shifts the latch plate 57 back to its retracted position.

Variations may be resorted to within the scope of the invention, and portions of the improvements may be used without others.

What is claimed is:

In a machine of the character described; a key depressible to an operative position and automatically restorable from said position, and means for locking said key against restoration, said key and means including, in combination, a key body having at its top a transverse slot, a latch plate slidable in said slot and having a finger-piece-forming tab extending above said body top, a disk overlying said body and formed to overlie and retain said latch plate in said slot, said disk having an opening through which said tab projects, a sleeve arranged to keep said body and disk together, said sleeve having a side-opening at said body slot, said latch plate being manually slidable at will, by means of said tab, between two positions, said latch plate being arranged to project through said sleeve opening in one of said positions and to be retracted in the other position, and a fixed element opposing the projected latch plate to lock the key in its depressed position.

HENRY L. PITMAN.